(12) United States Patent
Kaluza et al.

(10) Patent No.: US 10,558,456 B2
(45) Date of Patent: Feb. 11, 2020

(54) CONSTRUCTING BUILD ENVIRONMENTS FOR SOFTWARE

(71) Applicant: Red Hat, Inc., Raleigh, NC (US)

(72) Inventors: Jan Kaluza, Kravare (CZ); Michael Bonnet, Portland, OR (US); Petr Sabata, Brno (CZ); Matthew Prahl, Bedford, MA (US); Ralph Bean, Rochester, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/634,166

(22) Filed: Jun. 27, 2017

(65) Prior Publication Data

US 2018/0373525 A1    Dec. 27, 2018

(51) Int. Cl.
| | | |
|---|---|---|
| *G06F 9/44* | (2018.01) | |
| *G06F 9/445* | (2018.01) | |
| *G06F 11/36* | (2006.01) | |
| *G06F 8/41* | (2018.01) | |
| *G06F 8/70* | (2018.01) | |
| *G06F 8/61* | (2018.01) | |
| *G06F 8/40* | (2018.01) | |

(52) U.S. Cl.
CPC ............... *G06F 8/70* (2013.01); *G06F 8/40* (2013.01); *G06F 8/61* (2013.01)

(58) Field of Classification Search
CPC . H04L 67/12; H04L 67/34; G06F 8/65; G06F 8/71; G06F 8/60; G06F 8/61; G06F 8/63; G06F 8/34; G06F 11/3664; G06F 9/45558; G06F 9/45533; G06F 8/423; G06F 8/41; G06F 8/54; G06F 8/70; G06F 9/4856; G06F 9/5072; G06Q 30/04
See application file for complete search history.

(56) References Cited

U.S. PATENT DOCUMENTS

| | | | |
|---|---|---|---|
| 6,178,546 B1 * | 1/2001 | McIntyre | .................. G06F 8/10 717/115 |
| 7,444,625 B2 | 10/2008 | Anwar et al. | |
| 7,448,024 B2 | 11/2008 | Breeden et al. | |
| 8,276,128 B2 | 9/2012 | Beale et al. | |
| 8,458,658 B2 | 6/2013 | Faus et al. | |

(Continued)

OTHER PUBLICATIONS

Elsner et al., An infrastructure for composing build systems of software product lines, 8 pages (Year: 2011).*

(Continued)

*Primary Examiner* — Thuy Dao
(74) *Attorney, Agent, or Firm* — Kilpatrick Townsend & Stockton LLP (57) ABSTRACT

Build environments for software can be constructed. For example, a computing device can receive a file indicating a first software component to be installed in a build environment and a second software component to be built in the build environment. The computing device can perform a first setup phase for creating part of the build environment by causing the first software component to be installed in the build environment. The computing device can also determine that the first setup phase is complete. Based on determining that the first setup phase is complete, the computing device can perform a second setup phase for completing the build environment by causing the second software component to be built in the build environment.

21 Claims, 3 Drawing Sheets

(56) References Cited

U.S. PATENT DOCUMENTS

| | | | |
|---|---|---|---|
| 8,510,342 B1* | 8/2013 | Yang | G06F 8/71 707/798 |
| 8,863,077 B2* | 10/2014 | Lee | G06F 8/71 709/218 |
| 8,997,067 B2* | 3/2015 | Igelka | G06F 8/71 717/140 |
| 9,058,423 B1 | 6/2015 | Stone et al. | |
| 9,122,489 B1* | 9/2015 | Vanderpool | G06F 8/41 |
| 9,122,550 B2* | 9/2015 | Hsiao | G06F 8/61 |
| 9,578,088 B2* | 2/2017 | Nickolov | G06F 9/4856 |
| 9,898,393 B2* | 2/2018 | Moorthi | G06F 11/368 |
| 2002/0112232 A1* | 8/2002 | Ream | G06F 8/61 717/176 |
| 2004/0194082 A1* | 9/2004 | Purkeypile | G06F 8/63 717/174 |
| 2004/0267911 A1* | 12/2004 | Alam | G06F 8/60 709/220 |
| 2006/0059464 A1* | 3/2006 | Jameson | G06F 8/30 717/120 |
| 2007/0006176 A1 | 1/2007 | Spil et al. | |
| 2009/0007094 A1* | 1/2009 | Hinton | G06F 8/60 717/175 |
| 2012/0110567 A1* | 5/2012 | Lyons | G06F 8/61 717/177 |
| 2015/0339119 A1 | 11/2015 | Rehman et al. | |
| 2016/0253625 A1* | 9/2016 | Casey | G06Q 10/103 717/101 |
| 2018/0137032 A1* | 5/2018 | Tannous | G06F 11/3664 |
| 2018/0157550 A1* | 6/2018 | Ivanov | G06F 11/0712 |

OTHER PUBLICATIONS

Celik et al., Build system with lazy retrieval for Java projects, 12 pages (Year: 2016).*

"Bits of Bioinformatics: Building Binaries for Bioinformatics", Oct. 14, 2015, https://pmelsted.wordpress.com/2015/10/14/building-binaries-for-bioinformatics/.

* cited by examiner

CONSTRUCTING BUILD ENVIRONMENTS FOR SOFTWARE

TECHNICAL FIELD

The present disclosure relates generally to software development. More specifically, but not by way of limitation, this disclosure relates to constructing build environments for software.

BACKGROUND

Software can be built within a build environment. The software can be built by compiling, interpreting, or otherwise transforming source code for the software into another format (e.g., into a binary file). The build environment can be a virtual environment that has specific applications, libraries, shared objects, and other software components that may be integral for (e.g., required for) building the software. For example, the build environment can have a particular compiler installed, which can be used to compile the source code for the software into the binary file. The build environment may also have a set of libraries installed, which the compiler may need to successfully compile the source code into the binary file. The build environment may further have a specific operating system (e.g., Red Hat™ Linux) that supports the particular compiler.

DETAILED DESCRIPTION

It can be difficult for a software developer to create a build environment for software. For example, a software developer may need to manually install hundreds of applications, libraries, shared objects, and other software components within a build environment to enable the build environment to build a particular piece of software. And the software developer may need to install some or all of these software components within the build environment in a particular order because later-installed software components may rely on or be affected by earlier-installed software components. Also, the software developer may need to specifically configure the software components. This can be a labor intensive, time consuming, and expensive process. And if different build environments are required for different pieces of software, the software developer may need to manually configure each individual build environment.

Some examples of the present disclosure overcome one or more of the abovementioned issues by expediting (e.g., substantially automating) the process for constructing a build environment. For example, a user can specify a variety of characteristics for a build environment in a text file, such as a manifest file, on a computing device. The characteristics can include, for example, what software is to be installed or built within the build environment and an order in which the software is to be installed or built within the build environment. A setup application (e.g., executed by the computing device) can access the text file to determine the user-specified characteristics for the build environment. The setup application can then execute commands to create a build environment that has the characteristics specified by the user. This can result in a build environment being quickly and easily created in a substantially automated (e.g., with little or no manual intervention) manner. In some examples, users can create and share the text files for different types of build environments, enabling each other to quickly and easily replicate the different types of build environments.

Some examples of the present disclosure can enable previously created build-environments to be quickly recreated in a precise and substantially automated manner. This can make it easier for a software developer to re-build software at a later date. For example, the software developer can specify the characteristics of a build environment in a text file, and then use the setup application to create the build environment. Once the build environment has been created, the software developer can use the build environment to build source code for the software into a built version of the software. Thereafter, the software developer may need to modify the built version of the software. The software developer can use the text file and the setup application to again quickly and easily recreate the build environment (e.g., to create a build environment that is substantially identical to the prior build environment). Once the build environment has been recreated, the software developer can use the build environment to build a modified version of the software.

These illustrative examples are given to introduce the reader to the general subject matter discussed here and are not intended to limit the scope of the disclosed concepts. For example, although the above example is provided with reference to a text file, other types of files may be used. The following sections describe various additional features and examples with reference to the drawings in which like numerals indicate like elements but, like the illustrative examples, should not be used to limit the present disclosure.

Figure 1:
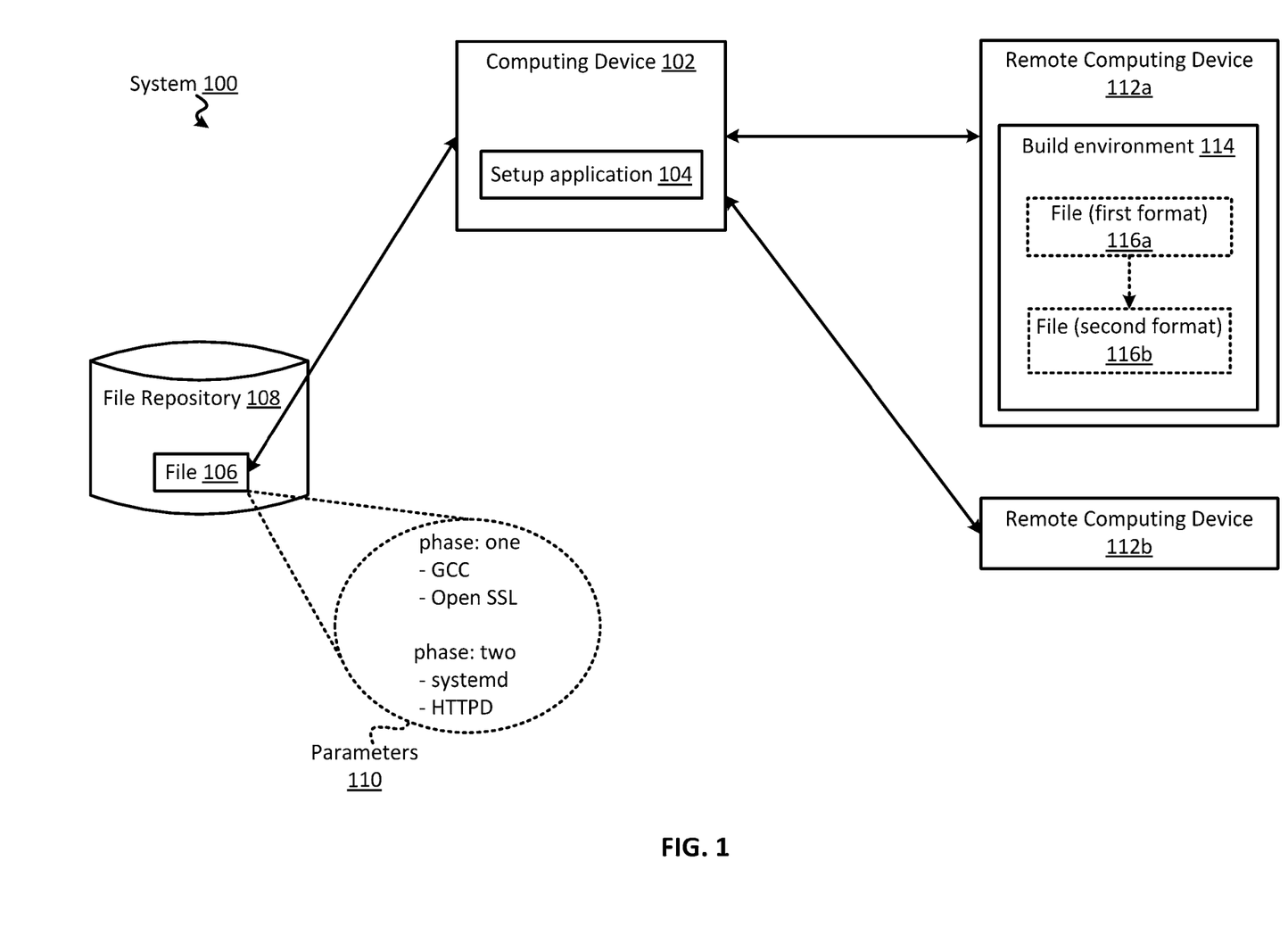
FIG. 1 is a block diagram of an example of a system for constructing build environments for software according to some aspects.

FIG. 1 is a block diagram of an example of a system 100 for constructing build environments for software according to some aspects. The system 100 includes a computing device 102 that can execute a setup application 104 for creating a build environment, such as build environment 114. The setup application 104 can access a file 106 that defines the characteristics of the build environment. The setup application 104 can then cause a build environment that has those characteristics to be created. The setup application 104 can cause the build environment to be created locally on the computing device 102 or on a remote computing device, such as remote computing device 112a.

More specifically, the system 100 includes a computing device 102. Examples of the computing device 102 can include a server, laptop computer, desktop computer, or any combination of these. The computing device 102 can execute the setup application 104, which can be software for creating build environments. Software can include computer-readable instructions that are executable by a processing device. The setup application 104 can be programmed in any suitable programming language, such as Java, C++, C, Python, or any combination of these.

The setup application 104 can access a file 106 to determine characteristics for a build environment. The file 106 may be stored locally on the computing device 102 or elsewhere, such as in a remote file repository 108 that includes one or more files for creating different types of build environments. The file 106 can include declarative statements, parameters 110, or other information indicating features that a build environment is to have. For example, the file 106 can indicate (i) software that are to be installed or built within the build environment, (ii) an operating system that the build environment is to have, (iii) an order in which software is to be installed or built within the build environment, (iv) that a group of software is to be installed or built concurrently (e.g., in parallel) in the build environment, or (v) any combination of these. In one particular example, the file 106 can specify that some software components (e.g., previously built software-components) are to be installed during a first setup phase for creating the build environment, and that other software components are to be built during a second setup phase for creating the build environment. This may enable, for example, foundational software (e.g., compilers, dynamic link libraries, other libraries, shared objects, code interpreters, etc.) to be installed during the first setup phase, and then other software that depends on or is affected by the foundational software to be later built during the second setup phase. In another example, the file 106 can specify that some software components are to be built during the first setup phase and that other software components are to be installed during the second setup phase. The file 106 can indicate that any amount and combination of software is to be installed or built in any number and combination of phases.

One example of the contents of the file 106 is shown in the dashed circle in FIG. 1. In this example, the contents of the file 106 are in a YAML Ain't Markup Language (YAML) format, but in other examples the contents can be in a different format. As shown, the file 106 indicates that GCC (a compiler) and OpenSSL (software for securing communications using secure socket layers (SSL)) are to be installed or built during a first setup phase. The file 106 also indicates that systemd (an init system used in Linux distributions to manage the user space and processes) and HTTPD (an Apache™ webserver) are to be installed or built during a second setup phase.

The setup application 104 can access the file 106 and determine one or more commands for creating the build environment 114 based on the contents of the file 106. In some examples, the commands are executed locally by the computing device 102 to locally create the build environment 114. Alternatively, the setup application 104 can transmit the commands synchronously or asynchronously to a remote computing device 112a to cause the remote computing device 112a to create the build environment 114. In some examples, the setup application 104 can transmit one or more of the commands to the remote computing device 112a, wait for responses from the remote computing device 112a, and then transmit one or more additional commands to the remote computing device 112a to create the build environment 114.

For example, the setup application 104 can transmit commands to the remote computing device 112a to implement a first setup phase, for example, in which GCC and Open SSL are to be installed in the build environment 114. The remote computing device 112a can then perform the first setup phase (or attempt to perform the first setup phase) and transmit a response to the setup application 104 indicating that the first setup phase is complete (or was unable to be completed). If the setup application 104 determines that the first setup phase was successfully completed, the setup application 104 can then transmit commands to the remote computing device 112a to implement a second setup phase, for example, in which systemd and HTTPD are to be built in the build environment 114. The remote computing device 112a can then perform the second setup phase (or attempt to perform the second setup phase) and transmit a response to the setup application 104 indicating that the second setup phase is complete (or was unable to be completed). The setup application 104 can transmit any number and combination of commands, in any order, and based on any number and combination of communications from the remote computing device 112a, to cause the build environment 114 to be created.

In some examples, the setup application 104 can cause the remote computing device 112a to create the build environment 114 by interacting with a build tool that at least partially controls the remote computing device 112a. A build tool can be software for creating a build environment, and some build tools can orchestrate the creation of a build environment on a cluster of nodes. For example, the remote computing device 112a can be part of a cluster of nodes that are controlled using a build tool such as Koji or Copr by Fedora™. The setup application 104 can transmit data to, and receive responses from, the build tool to create the build environment 114. For example, the setup application 104 can transmit authentication information to the build tool, and then after the setup application 104 has been successfully authenticated by the build tool, the setup application 104 can transmit commands to the build tool for causing the remote computing device 112a to create the build environment 114. The commands can be in any suitable format. For example, the commands can be Hypertext Transfer Markup Language (HTTP) Representational State Transfer (REST) commands.

In some examples, the setup application 104 can generate a software package and submit the software package to a build tool (e.g., to Koji) as part of the process for creating the build environment 114. The software package can be or can include a Red Hat™ Package Manager (RPM) file, which can have one or more macros. The setup application 104 can generate the software package on-the-fly (e.g., as part of the process for creating the build environment) or prior to beginning the process of creating the build environment 114.

In some examples, the setup application 104 can determine if a remote computing device has capacity to create the build environment 114 prior to causing the remote computing device to create the build environment 114. For example, the setup application 104 can communicate with the remote computing device 112b to determine if the remote computing device 112b already has an existing build environment or is performing a preset number of builds. If the remote computing device 112b already has an existing build environment or is performing the preset number of builds, the setup application 104 can determine that the remote computing device 112b does not have the capacity to create a new build environment 114. So, the setup application 104 can cause the build environment 114 to be created on an alternative remote computing device, such as remote computing device 112a. This may help ensure that a remote computing device does not become overloaded.

Once the build environment 114 has been created, it can be used to perform a variety of tasks. For example, the computing device 102 can issue commands to cause the build environment 114 to perform the tasks. In some examples, the build environment 114 can be used to convert a file from one format 116a into another format 116b. For example, the build environment 114 can be used to convert source code (or a file in another human-readable format) into a binary format (or another machine-readable format).

Although FIG. 1 depicts a certain arrangement of components (e.g., the file repository 108, file 106, computing device 102, and remote computing devices 112a-b) for illustrative purposes, other examples can include any number and combination of these components arranged in any suitable configuration. Another arrangement of components is shown in FIG. 2 and described in greater detail below.

Figure 2:
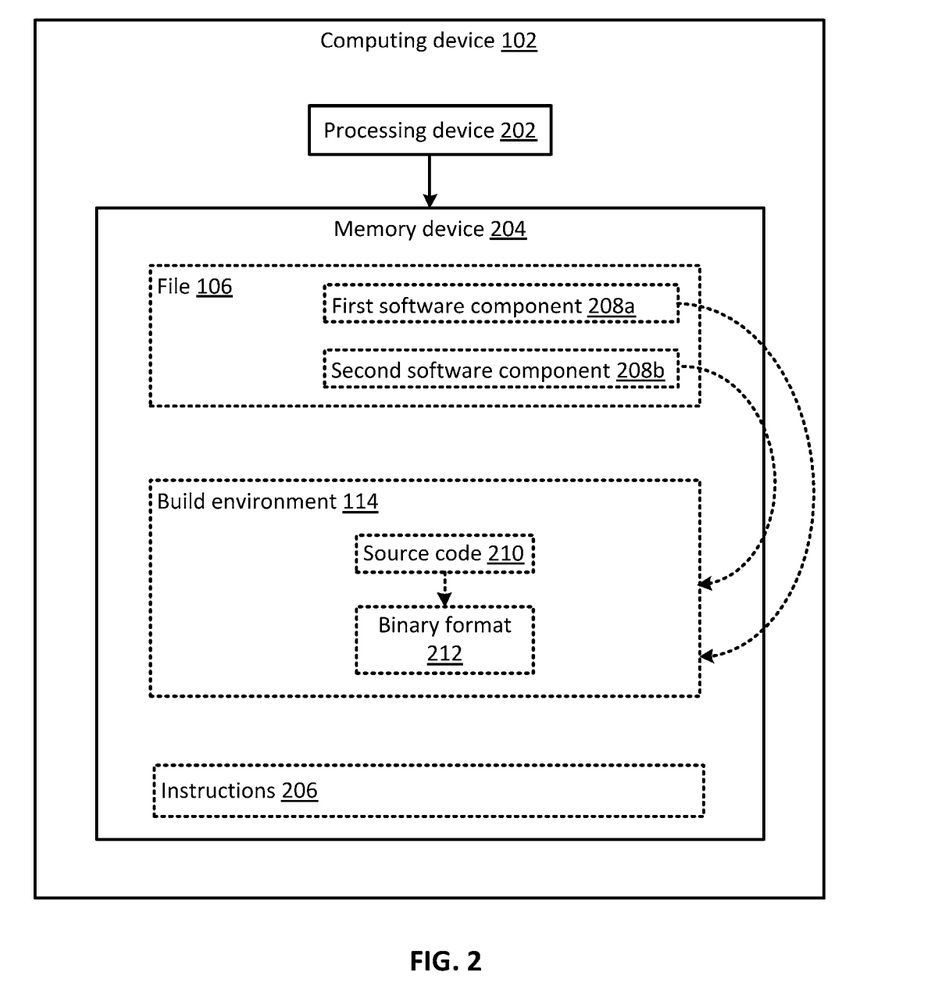
FIG. 2 is a block diagram of an example of a computing device for constructing build environments for software according to some aspects.

Referring now to FIG. 2, some examples of the present disclosure include a computing device 102 having a processing device 202 communicatively coupled to a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc.

The processing device 202 can execute one or more operations for constructing build environments for software. The processing device 202 can execute instructions 206 stored in the memory device 204 to perform the operations. In some examples, the instructions 206 can include processor-specific instructions generated by a compiler or an interpreter from code written in any suitable computer-programming language, such as C, C++, C#, etc. The instructions 206 can be, for example, program code for the setup application 104 of FIG. 1.

Memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device with computer-readable instructions 206 or other program code. Non-limiting examples of a computer-readable medium include magnetic disk(s), memory chip(s), ROM, random-access memory (RAM), an ASIC, a configured processor, optical storage, or any other medium from which a computer processor can read instructions 206.

The memory device 204 can also include one or more files. Each file can be for creating a build environment that has certain characteristics. An example of the files can be file 106, which can indicate that a build environment 114 is to have a first software component 208a and a second software component 208b. Examples of the software components 208a-b can be any of the software discussed above, such as compilers, libraries, shared objects, webservers, files, init systems, SSL clients, RPM files, binary files, or any combination of these.

In some examples, the processing device 202 can access the file 106 and use the contents of the file 106 to create the build environment 114. For example, the processing device 202 can determine a sequence of commands to execute to create a build environment 114 having the software components 208a-b described in the file 106. The processing device 202 can then execute the commands to create the build environment 114. For example, the processing device 202 can then execute the commands to cause the software components 208a-b to be installed or built (as represented by the dashed arrows) within the build environment 114. In some examples, the processing device 202 can then use the build environment 114 to perform one or more tasks, such as converting source code 210 for software into a binary format 212 (e.g., a binary file).

Figure 3:
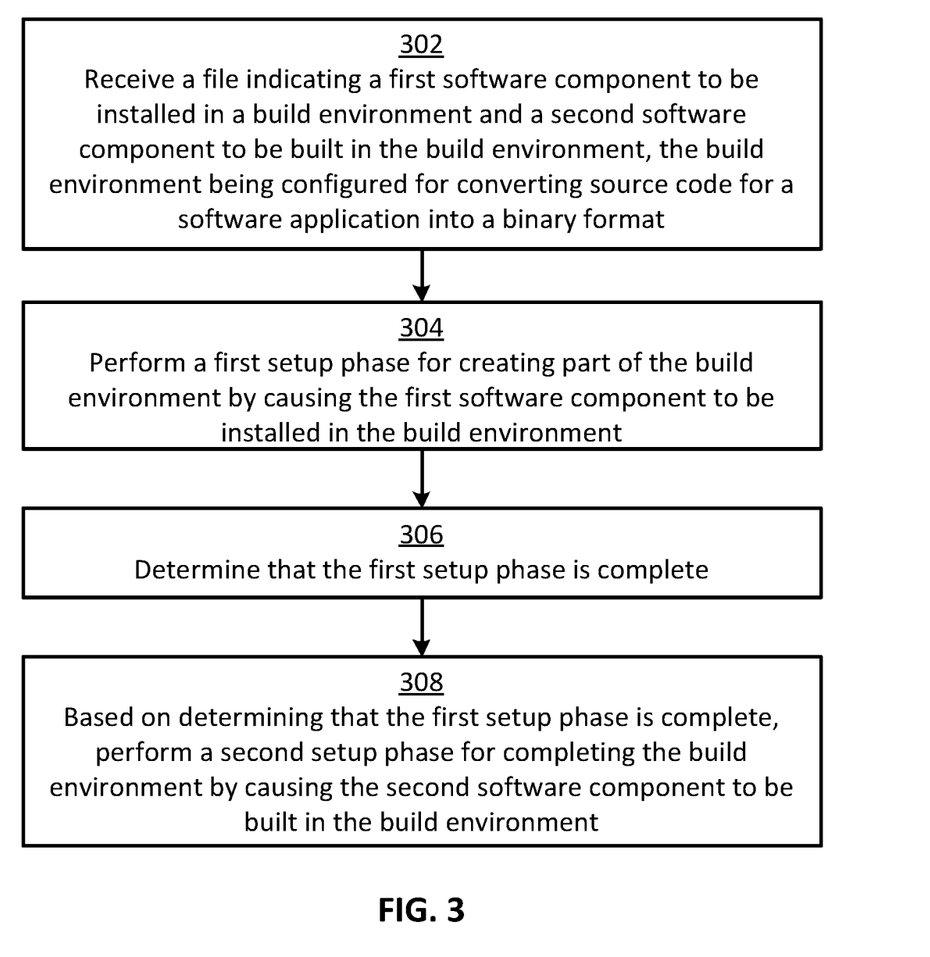
FIG. 3 is a flow chart of an example of a process for constructing build environments for software according to some aspects.

In some examples, the processing device 202 can perform one or more of the steps shown in FIG. 3 to create the build environment 114. In other examples, the processing device 202 can implement more steps, fewer steps, different steps, or a different order of the steps depicted in FIG. 3. The steps of FIG. 3 are described below with reference to components discussed above.

In block 302, the processing device 202 receives a file 106 indicating that a first software component 208a is to be installed in a build environment 114 and a second software component 208b is to be built in the build environment. In some examples, the processing device 202 can receive the file 106 from a remote computing device via a local area network (LAN), a wide area network (WAN), or the Internet. Alternatively, the processing device 202 can receive the file 106 from a local memory device 204. The build environment 114 can be for converting source code 210 into binary format 212.

In block 304, the processing device 202 performs a first setup phase for creating part of the build environment 114 by causing the first software component 208a to be installed in the build environment 114. For example, the processing device 202 can begin by generating the build environment 114. The processing device 202 can generate the build environment 114 by running a build tool for creating build environments, such as rpm-build by Red Hat™. As a particular example, if the computing device 102 already has rpm-build installed, the processing device 202 can execute the following commands to generate the build environment 114:

mkdir -p ~/rpmbuild/{BUILD,RPMS,SOURCES, SPECS,SRPMS} echo '%_topdir % (echo $HOME)/rpmbuild' >~/.rpm-macros

After generating the build environment 114, the processing device 202 can execute additional commands to cause the first software component 208a to be installed in the build environment 114. For example, if the first software component 208a is GCC, the processing device can execute the following command to install GCC within the build environment 114:

yum install GCC

As another example, if the first software component 208a is "make," the processing device can execute the following command to install make within the build environment 114:

yum install make

In examples in which the build environment 114 is to be created on a remote computing device 112a, the processing device 202 can transmit communications to the remote computing device 112a for causing the remote computing device 112a to execute the abovementioned commands or other commands to implement the first setup phase.

In block 306, the processing device 202 determines that the first setup phase is complete. For example, the processing device 202 can determine if the first software component 208a has been successfully installed, which may indicate that the first setup phase is complete. In examples in which the first setup phase includes installing multiple software components, the processing device 202 can determine if some or all of the software components have been successfully installed, which may indicate that the first setup phase is complete.

In examples in which the build environment 114 is to be created on the remote computing device 112a, the processing device 202 can receive an electronic communication from the remote computing device 112a indicating that the first setup phase has been completed. For example, the processing device 202 can receive an electronic communication from the remote computing device 112a indicating that software components related to the first setup phase have been successfully installed. The processing device 202 can determine that the first setup phase is complete based on the electronic communication.

In block 308, the processing device 202 performs a second setup phase for completing the build environment 114 based on determining that the first setup phase is complete. The processing device 202 can perform the second setup phase by causing the second software component 208b to be built (or installed) in the build environment 114. For example, if the build environment 114 was created using rpm-build and the second software component 208b is wget (a program for retrieving content from web servers), the processing device 202 can cause the second software component 208b to be built in the build environment 114 by executing the following command:

rpmbuild -v -bb --clean SPECS/wget.spec where -bb can be a flag for building a binary file, -v can be a flag for verbose output, and -clean can cause rpm-build to remove a build tree after wget is built.

In other examples in which the build environment 114 is to be created on a remote computing device 112a, the processing device 202 can transmit communications to the remote computing device 112a for causing the remote computing device 112a to execute the abovementioned commands or other commands to implement the second setup phase.

Although the above example includes a first software component 208a being installed during a first setup phase and a second software component 208b being built during a second setup phase, in other examples the processing device 202 can cause any number and combination of software components to be installed or built during a particular setup phase.

For example, the processing device 202 can cause multiple software components to be installed or built in a sequential order during a particular setup phase. The processing device 202 may determine the sequential order based on an order specified in the file 106, dependencies between the software components, or both. For example, if a second software component is dependent on a first software component (e.g., the second software component can only be successfully built after a first software component has been built), the processing device 202 can build the first software component and then build the second software component. In some examples, dependencies between the software can be specified in the file 106, and the processing device 202 can determine the dependencies by accessing the file 106. In one such example, if the dependencies are not specified in the file 106, the processing device 202 can generate an error message or otherwise notify a user. In other examples, the processing device 202 can determine the dependencies between the software components using (i) a lookup table that maps a software component to its dependencies; (ii) a configuration file or an installation file for a software component that lists the software component's dependencies: or (iii) both of these. For example, a particular software component may have a configuration file that indicates other software components on which the particular software component depends. The processing device 202 can access the configuration file to determine that the particular software component is dependent on the other software components. Based on determining this dependency, the processing device 202 can cause the other software components to be installed within the build environment 114 before the particular software component is built within the build environment 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A computing device comprising:
   a processing device; and
   a memory device including instructions that are executable by the processing device for causing the processing device to:
      receive a file indicating a first software component to be installed in a build environment and a second software component to be built in the build environment, wherein the second software component is source code, and wherein the build environment is a virtual environment configured for building one or more software applications using the first software component and the second software component;
      perform a first setup phase for creating part of the build environment by causing the first software component to be installed in the build environment;
      determine that the first setup phase is complete; and
      based on determining that the first setup phase is complete, perform a second setup phase for completing the build environment by causing the second software component to be built in the build environment, wherein the second software component is built in the build environment at least in part by compiling the source code with a compiler or interpreting the source code with an interpreter.

2. The computing device of claim 1, wherein the second software component depends on the first software component such that the first software component must be installed in the build environment to enable the second software component to be built in the build environment.

3. The computing device of claim 1, wherein the file is in a YAML format.

4. The computing device of claim 1, wherein the file indicates a first plurality of software components to be installed during the first setup phase and a second plurality of software components to be built during the second setup phase, and wherein the memory device further comprises instructions that are executable by the processing device for causing the processing device to:
   cause the first plurality of software components to be installed in the build environment during the first setup phase; and
   cause the second plurality of software components to be built in the build environment during the second setup phase.

5. The computing device of claim 4, wherein the memory device further comprises instructions that are executable by the processing device for causing the processing device to:
   determine a sequential order in which to build the second plurality of software components based on dependencies between the software components in the second plurality of software components; and
   cause the second plurality of software components to be built in the sequential order.

6. The computing device of claim 1, wherein the file specifies that a group of software components are to be built in parallel in the build environment, and wherein the memory device further comprises instructions that are executable by the processing device for causing the processing device to cause the group of software components to be built in parallel in the build environment.

7. The computing device of claim 1, wherein the memory device further comprises instructions that are executable by the processing device for causing the processing device to, prior to initiating the first setup phase:
   determine that a remote computing device is performing fewer than a predefined number of builds by electronically communicating with the remote computing device; and
   based on determining that the remote computing device is performing fewer than the predefined number of builds, cause the build environment to be created on the remote computing device by:
      transmitting a first command to the remote computing device, the first command being configured to cause the remote computing device to build part of the build environment by installing the first software component in the build environment; and
      transmitting a second command to the remote computing device, the second command being configured to cause the remote computing device to complete the build environment by building the second software component in the build environment.

8. The computing device of claim 1, wherein the one or more software applications are binary files.

9. A method comprising:
   receiving, by a computing device, a file indicating a first software component to be installed in a build environment and a second software component to be built in the build environment, wherein the second software component is source code, and wherein the build environment is a virtual environment configured for building one or more software applications using the first software component and the second software component;
   performing, by the computing device, a first setup phase for creating part of the build environment by causing the first software component to be installed in the build environment;
   determining, by the computing device, that the first setup phase is complete; and
   based on determining that the first setup phase is complete, performing, by the computing device, a second setup phase for completing the build environment by causing the second software component to be built in the build environment, wherein the second software component is built in the build environment at least in part by compiling the source code with a compiler or interpreting the source code with an interpreter.

10. The method of claim 9, wherein the second software component depends on the first software component such that the first software component must be installed in the build environment to enable the second software component to be built in the build environment.

11. The method of claim 9, wherein the file is in a YAML format.

12. The method of claim 9, wherein the file indicates a first plurality of software components to be installed during the first setup phase and a second plurality of software components to be built during the second setup phase, and further comprising:
   causing the first plurality of software components to be installed in the build environment during the first setup phase; and
   causing the second plurality of software components to be built in the build environment during the second setup phase.

13. The method of claim 12, further comprising:
   determining a sequential order in which to build the second plurality of software components based on dependencies between the software components in the second plurality of software components; and
   causing the second plurality of software components to be built in the sequential order.

14. The method of claim 9, wherein the file specifies that a group of software components are to be built in parallel in the build environment, and further comprising causing the group of software components to be built in parallel in the build environment.

15. The method of claim 9, further comprising, prior to initiating the first setup phase:
   determining that a remote computing device is performing fewer than a predefined number of builds by electronically communicating with the remote computing device; and
   based on determining that the remote computing device is performing fewer than the predefined number of builds, causing the build environment to be created on the remote computing device by:
      transmitting a first command to the remote computing device, the first command being configured to cause the remote computing device to build part of the build environment by installing the first software component in the build environment; and
      transmitting a second command to the remote computing device, the second command being configured to cause the remote computing device to complete the build environment by building the second software component in the build environment.

16. A non-transitory computer-readable medium comprising program code that is executable by a processing device for causing the processing device to:
   receive a file indicating a first software component to be installed in a build environment and a second software component to be built in the build environment, wherein the second software component is source code, and wherein the build environment is a virtual environment configured for building one or more software applications using the first software component and the second software component;
   perform a first setup phase for creating part of the build environment by causing the first software component to be installed in the build environment;
   determine that the first setup phase is complete; and
   based on determining that the first setup phase is complete, perform a second setup phase for completing the build environment by causing the second software component to be built in the build environment, wherein the second software component is built in the build environment at least in part by compiling the source code with a compiler or interpreting the source code with an interpreter.

17. The non-transitory computer-readable medium of claim 16, wherein the second software component depends on the first software component such that the first software component must be installed in the build environment to enable the second software component to be built in the build environment.

18. The non-transitory computer-readable medium of claim 16, wherein the file indicates a first plurality of software components to be installed during the first setup phase and a second plurality of software components to be built during the second setup phase, and further comprising program code that is executable by the processing device for causing the processing device to:

cause the first plurality of software components to be installed in the build environment during the first setup phase; and     cause the second plurality of software components to be built in the build environment during the second setup phase.

19. The non-transitory computer-readable medium of claim 18, further comprising program code that is executable by the processing device for causing the processing device to:

determine a sequential order in which to build the second plurality of software components based on dependencies between the software components in the second plurality of software components; and     cause the second plurality of software components to be built in the sequential order.

20. The non-transitory computer-readable medium of claim 16, wherein the file specifies that a group of software components are to be built in parallel in the build environment, and further comprising program code that is executable by the processing device for causing the processing device to cause the group of software components to be built in parallel in the build environment.

21. The non-transitory computer-readable medium of claim 16, further comprising program code that is executable by the processing device for causing the processing device to, prior to initiating the first setup phase:

determine that a remote computing device is performing fewer than a predefined number of builds by electronically communicating with the remote computing device; and     based on determining that the remote computing device is performing fewer than the predefined number of builds, cause the build environment to be created on the remote computing device by:

transmitting a first command to the remote computing device, the first command being configured to cause the remote computing device to build part of the build environment by installing the first software component in the build environment; and     transmitting a second command to the remote computing device, the second command being configured to cause the remote computing device to complete the build environment by building the second software component in the build environment.

\* \* \* \* \*